US008149695B2

(12) United States Patent
Khanna et al.

(10) Patent No.: US 8,149,695 B2
(45) Date of Patent: Apr. 3, 2012

(54) DYNAMIC QUEUE INSTANTIATION

(75) Inventors: Bakul Khanna, Lexington, MA (US); Leigh McLellan, Framingham, MA (US); Robert Lee, Lexington, MA (US); Dale Nash, Sudbury, MA (US)

(73) Assignee: Avaya Holdings Limited, Basking Ridge, NJ (US)

( * ) Notice: Subject to any disclaimer, the term of this patent is extended or adjusted under 35 U.S.C. 154(b) by 567 days.

(21) Appl. No.: 11/315,893

(22) Filed: Dec. 22, 2005

(65) Prior Publication Data
US 2007/0147402 A1   Jun. 28, 2007

(51) Int. Cl.
G01R 31/08 (2006.01)
G06F 11/00 (2006.01)
G08C 15/00 (2006.01)
H04J 1/16 (2006.01)
H04J 3/14 (2006.01)
H04L 12/26 (2006.01)
H04L 12/28 (2006.01)

(52) U.S. Cl. ..................... 370/230; 370/395.4
(58) Field of Classification Search .................. 370/236
See application file for complete search history.

(56) References Cited

U.S. PATENT DOCUMENTS

| 6,577,596 | B1* | 6/2003 | Olsson et al. ................. 370/230 |
| 6,577,644 | B1 | 6/2003 | Chuah |
| 6,754,714 | B1 | 6/2004 | Chebrolu |
| 6,795,435 | B1* | 9/2004 | Jouppi et al. ................. 370/394 |
| 6,912,197 | B2 | 6/2005 | Mahamuni |
| 2003/0076849 | A1* | 4/2003 | Morgan et al. ................. 370/412 |

OTHER PUBLICATIONS

C. Bormann, The Multi-Class Extension to Multi-Link PPP, Sep. 1999, Internet Engineering Task Force, pp. 1-11.*
Mooi Chuah, Enrique Hernandez-Valencia and Matt Holdrege, QoS Mapping Extensions to Multilink PPP, Jun. 1999, Internet Engineering Task Force, pp. 1-12.*
W. Simpson, The Point-to-Point Protocol, RFC 1661, Jul. 1994, pp. 1-54.*
C. Bormann, Providing Integrated Services over Low-bitrate Links, RFC 2689, Sep. 1999, pp. 1-14.*
Bormann, C.; "The Multi-Class Extension to Multi-Link PPP"; RFC 2686; Sep. 1999; 12 pages.
Blake S., et al.; "An Architecture for Differentiated Services"; RFC 2475; Dec. 1998; 36 pages.
Nichols, K. et al.; "Definition of the Differentiated Services Field (DS Field) in the IPv4 and IPv6 Headers"; RFC 2474; Dec. 1998; 20 pages.
Malkin, G. et al.; "F.Y.I. on F.Y.I. Introduction to the F.Y.I. Notes"; RFC 1990; Mar. 1990; 4 pages.
Simpson, W.; "PPP Link Quality Monitoring"; RFC 1989; Aug. 1996; 16 pages.
Sklower, K. et al.; The PPP Multilink Protocol (MP); RFC 1717; Nov. 1994; 21 pages.

* cited by examiner

*Primary Examiner* — Ian N Moore
*Assistant Examiner* — Christopher Crutchfield
(74) *Attorney, Agent, or Firm* — Chapin IP Law, LLC; David W. Rouille, Esq.

(57) ABSTRACT

A Point to Point Protocol ("PPP") link running PPP Multilink Protocol with multi-class extensions ("Multilink-Extension") having both peers on the PPP link support a number of egress priority queues negotiated during the Multilink-Extension negotiation. Each peer also establishes a number of classes equal to the negotiated number of egress priority queues. Thus, communication devices that have a different default number, or different maximum number, of egress priority queues can interoperate in a manner that ensures packets have the same per-hop behavior ("PHB"). The present invention is both memory efficient and processing time efficient because only the minimum number of egress priority queues necessary are instantiated.

16 Claims, 2 Drawing Sheets

DYNAMIC QUEUE INSTANTIATION

FIELD OF THE INVENTION

Figure 1:
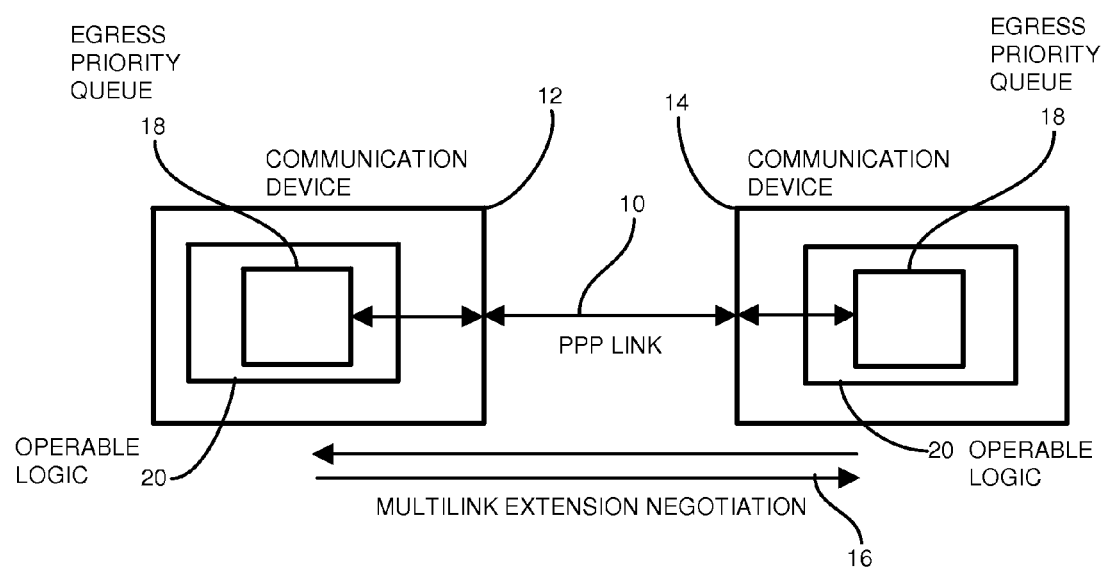

The present invention relates generally to IP networks. More particularly, the present invention relates to Point to Point Protocol ("PPP") links running PPP Multilink Protocol with multi-class extensions.

BACKGROUND OF THE INVENTION

PPP Multilink Protocol ("MP" or "Multilink" or "Multilink Protocol") provides a method for splitting, recombining, and sequencing datagrams across multiple logical data links (that is, interfaces). A frame is a unit of transmission in the data link layer, consisting of a frame header and a packet. An Internet Protocol ("IP") datagram is a unit of end-to-end transmission in the IP protocol. It consists of an IP header followed by the Transmission Control Protocol ("TCP") segment. A packet is a generic way to refer to datagrams that are either whole (that is, an IP datagram) or fragmented (that is, an IP datagram fragment). Multilink allows packets to be fragmented and the fragments to be sent over multiple PPP links to the same remote address resulting in aggregation of traffic across multiple links for extra bandwidth and redundancy.

Multilink with multi-class extensions ("Multilink-Extension") is typically used to provide Quality of Service ("QOS") to data traffic by using fragmentation and interleaving of packets across a multi-link interface. Thus, Multilink-Extension allows a sender to fragment packets of various priorities into multiple classes of fragments, allowing high-priority packets to be sent between fragments of lower priorities.

SUMMARY OF THE INVENTION

The present invention provides for both peers on a PPP link running Multilink-Extension to negotiate the same number of egress priority queues as well as negotiate a number of Multilink classes equal to the negotiated number of egress priority queues. Thus, both ends of the PPP link support the same number of egress priority queues and the same number of Multilink-Extension classes. This allows communication devices that have a different default number, or different maximum number, of egress priority queues to interoperate in a manner that ensures packets have the same per-hop behavior ("PHB"). The present invention is both memory efficient and processing time efficient because only the minimum number of egress priority queues necessary are instantiated.

In a first aspect, the present invention embodies a communication device comprising a number of egress priority queues determined during a Multilink-Extension negotiation. In a second aspect, the present invention embodies a PPP link comprising two peers having an equal number of egress priority queues determined during a Multilink-Extension negotiation. In a third aspect, the present invention embodies a method comprising negotiating a number of egress priority queues to instantiate during a Multilink-Extension negotiation.

DETAILED DESCRIPTION OF THE INVENTION

As is known in the art, Multilink is based on a Link Control Protocol ("LCP") option negotiation ("Multlink negotiation") that permits a system to indicate to its peer that it is capable of combining multiple physical links into a "bundle." Multilink is negotiated during the initial LCP option negotiation. A system indicates to its peer that it is willing to do Multilink by sending the Multilink option as part of the initial LCP option negotiation. This negotiation indicates three things: 1) the system offering the option is capable of combining multiple physical links into one logical link; 2) the system is capable of receiving upper layer protocol data units ("PDUs") fragmented using the Multilink header (described herein) and reassembling the fragments back into the original PDU for processing; and 3) the system is capable of receiving PDUs of size N octets where N is specified as part of the option even if N is larger than the maximum receive unit ("MRU") for a single physical link. Once Multilink has been successfully negotiated, the sending system is free to send PDUs encapsulated and/or fragmented with the Multilink header.

Individual fragments are the "packets" in the Multilink Protocol. Network Protocol packets are first encapsulated (but not framed) according to normal PPP procedures, and large packets are broken up into multiple segments sized appropriately for the multiple physical links. Multilink implementations do not include the Address and Control Field in the logical entity to be fragmented, even though it would otherwise be permitted by the PPP specification. A new PPP header consisting of the Multilink Identifier and the Multilink header ("MP Header") is inserted before each section. In this manner, the first fragment of a Multilink packet in PPP will have two headers—one for the fragment, followed by the header for the packet itself. In systems implementing Multilink, there is no requirement that the segments be of equal size, or that packets must be broken up at all.

Multilink fragments are encapsulated using the protocol identifier ("PID") 0x00-0x3d, as shown in Structure 1.

| Structure 1: Long Sequence Number Fragment Format | | | | | | | | | |
|---|---|---|---|---|---|---|---|---|---|
| PPP Header: | | | Address 0xff | | | | | Control 0x03 | |
| | | | PID (H) 0x00 | | | | | PID (L) 0x3d | |
| MP Header: | B | E | 0 | 0 | 0 | 0 | 0 | 0 | sequence number |
| | | | sequence number (L) | | | | | | |
| | | | fragment data | | | | | | |
| | | | . | | | | | | |
| | | | . | | | | | | |
| PPP FCS: | | | | FCS | | | | | |

Following the protocol identifier is a 4-byte header (that is, the MP Header) containing a sequence number, and two 1-bit fields indicating that the fragment begins a packet or terminates a packet. This format is generally referred to in the art as The Long Sequence Number Fragment Format. The Beginning fragment bit, indicated as B in Structure 1, is a 1-bit field set to 1 on the first fragment derived from a PPP packet and set to 0 for all other fragments from the same PPP packet. The Ending fragment bit, indicated as E in Structure 1, is a 1-bit field set to 1 on the last fragment and set to 0 for all other fragments. A fragment may have both the Beginning and Ending fragment bits set to 1. The Sequence Field is a 24-bit sequence number that is incremented for every fragment transmitted. Between the Ending fragment bit and the sequence number is a 6-bit field that will be discussed later. In Structure 1, the bits in this 6-bit field are all set to 0.

After negotiation of an additional PPP LCP option, the 4-byte header may be optionally replaced by a 2-byte header with only a 12-bit sequence number. This format is shown in Structure 2 and is generally referred to in the art as The Short Sequence Number Fragment Format. Between the Ending fragment bit and the sequence number is a 2-bit field that will be discussed later. In Structure 2, the bits in this 2-bit field are both set to 0.

| Structure 2: Short Sequence Number Fragment Format | | | |
|---|---|---|---|
| PPP Header: | Address 0xff | | Control 0x03 |
| | PID (H) 0x00 | | PID (L) 0x3d |
| MP Header: | B E 0 0 | | sequence number |
| | fragment data | | |
| | . | | |
| | . | | |
| | . | | |
| PPP FCS: | | FCS | |

As is know in the art Multilink can be extended to multiple classes ("Multilink-Extension"). Multilink-Extension is typically used to provide Quality of Service ("QOS") to data traffic by using fragmentation and interleaving of packets across a Multilink interface. In Multilink-Extension, when using the short sequence number format, the 2-bit field after the Ending fragment bit in the packet is used to store a class number, designating one of four possible classes. This is illustrated in Structure 3, wherein cls is the class number.

| Structure 3: Short Sequence Number Fragment Format With Classes | | | |
|---|---|---|---|
| PPP Header: | Address 0xff | | Control 0x03 |
| | PID (H) 0x00 | | PID (L) 0x3d |
| MP Header: | B E | cls | sequence number |
| | fragment data | | |
| | . | | |
| | . | | |
| | . | | |
| PPP FCS: | | FCS | |

In Multilink-Extension, when using the long sequence number format, four of the bits in the 6-bit field after the Ending fragment bit in the packet is used to store the class number. This is illustrated in Structure 4, wherein cls is the 4-bit class number.

| Structure 4: Long Sequence Number Fragment Format With Classes | | | |
|---|---|---|---|
| PPP Header: | Address 0xff | | Control 0x03 |
| | PID (H) 0x00 | | PID (L) 0x3d |
| MP Header: | B E cls 0 0 | | sequence number |
| | sequence number (L) | | |
| | fragment data | | |
| | . | | |
| | . | | |
| | . | | |
| PPP FCS: | | FCS | |

Generally, two communication devices on a PPP link 10, referred to herein as peers, establish Multilink-Extension via a LCP negotiation. The establishment of Multilink-Extension between two peers will be referred to herein as a Multilink-Extension negotiation. Multilink-Extension negotiations, per se, are known in the art. Communication devices of the prior art, engaging in a Multilink-Extension negotiation, establish a number of classes (referred to herein as "classes" or "PPP classes"). At the time of a prior art Multilink-Extension negotiation, each peer will have established a number of egress priority queues according to a default profile. Communication devices of the prior art each have a default number of egress priority queues that the device supports. This default number of queues will often be the maximum number of queues supportable by the communication device. The default number, and maximum number, of supportable egress priority queues on two communication devices may differ. This is frequently the situation, for example, when the two communication devices are manufactured by two different vendors. Thus, when two communication devices of the prior art engage in a Multilink-Extension negotiation, the negotiation frequently results in a Multilink-Extension wherein the two communication devices are each supporting a different number of egress priority queues. Such a prior art Multilink-Extension negotiation generally results in classes exhibiting different PHB or results in the Multilink-Extension being inoperable altogether.

Figure 2:
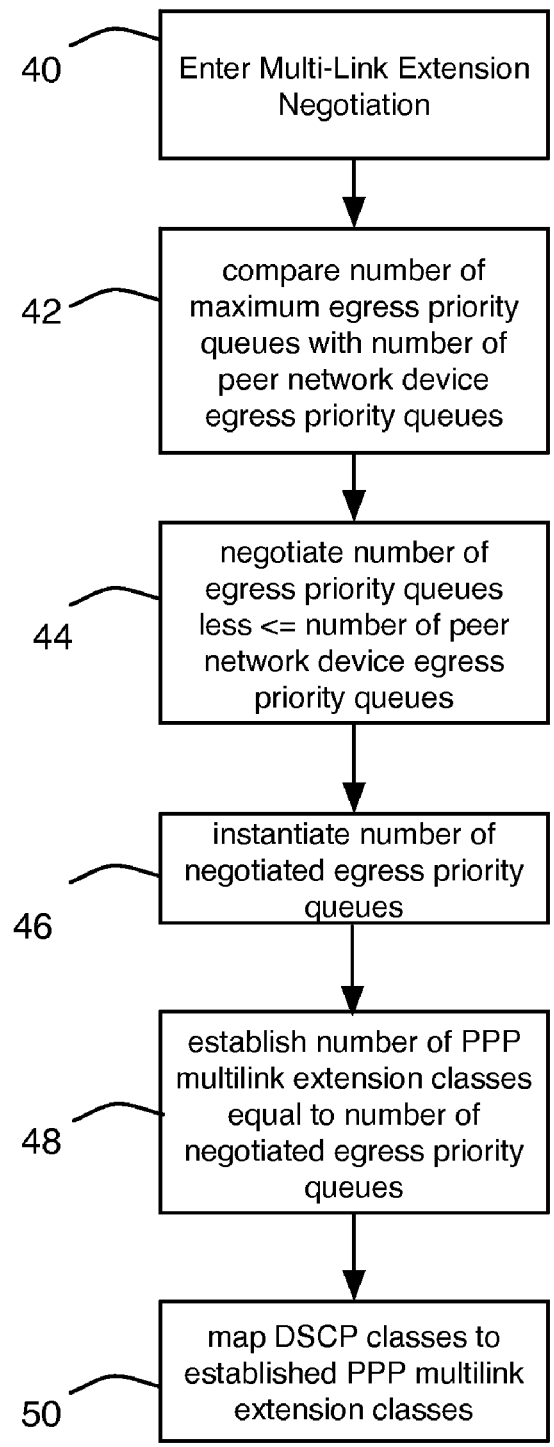

In a communication device 12, 14 of the present invention (FIG. 1,), the number of egress priority queues 18 to support a Multilink Extension is negotiated during the Multilink-Extension negotiation 16. Additionally, the number of classes negotiated during the Multilink-Extension negotiation 16 is equal to the negotiated number of egress priority queues 18. Once this negotiated number of egress priority queues 18 is determined, the queues 18 are said to be instantiated dynamically. That is, the queues 18 are instantiated during or as a result of a Multilink-Extension negotiation. During the Multilink-Extension negotiation 16 in the present invention (FIG. 2 step 40), the peers compare the maximum number of egress priority queues 18 supported on each peer (FIG. 2 step 42) and then each agree to instantiate an equal number of egress priority queues 18, wherein the instantiated equal number of queues 18 is equal to or less than the maximum number of queues 18 supported by either peer (FIG. 2 step 44). For example, two peers may enter into a Multilink-Extension negotiation 16 with the first peer capable of supporting eight queues 18 and the second peer capable of supporting only two queues 18. In accordance with the present invention, the two peers will negotiate and determine the number of queues 18 for each peer to instantiate (FIG. 2 step 46). In this example, the determined number of queues 18 will be equal to or less than two. Once the number is determined, each peer will instantiate two queues 18. On the other hand, if the peers negotiate to instantiate only one queue 18, then each peer will instantiate one egress priority queue 18. Additionally, the two peers will each agree to establish a number of classes equal to the negotiated number of egress priority queues (FIG. 2 step 48).

In the prior art, to the contrary, each individual peer determines the number of egress priority queues to use in a Multilink-Extension. Two peers in a Multilink-Extension negotiation frequently can have a different number of egress priority queues, which is an undesirable situation. In the present invention, on the other hand, two peers negotiate to instantiate an equal number of egress priority queues. Thus, in a Multilink-Extension of the present invention, one or both peers will typically change the number of queues that was being supported when the peers entered into the Multilink-Extension negotiation. In the example above, for example, one of the peers may have been supporting as many as eight queues when the Multilink-Extension was entered into. As a result of the Multilink-Extension negotiation, the peer supports either one or two egress priority queues.

Differentiated Services ("DS") enhancements to the Internet Protocol are also known in the art and will not be described in detail, but will be summarized herein. Generally, a header field, called a DS field, contains six bits ("DSCP field") that are used as a codepoint ("DS Codepoint" or "DSCP") to select Per-Hop Behavior ("PHB") a packet experiences at each node in a network. DS-compliant nodes in a network select PHBs by matching against the DSCP field. This can be accomplished, for example, by treating the value of the field (that is, the codepoint) as a table index which is used to select a particular packet handling mechanism, which has been implemented in that device. This selection is typically referred to as a mapping of the codepoints to PHBs. This mapping is configurable in DS-compliant nodes. Thus, a DS-compliant node supports the logical equivalent of a configurable mapping table from codepoints to PHBs.

Preferred embodiments of the present invention establish a DSCP-to-PPP class mapping in peers that negotiate Multilink-Extension (FIG. 2 step 50). The DSCP-to-PPP class mapping can be used to make peers (that is, nodes) of the present invention DS-compliant. Examples of DSCP-to-PPP class mappings, in accordance with the present invention, are shown in Table 1. The first DSCP-to-PPP class mapping in Table 1 shows 4 PPP classes, numbered 0 to 3, resulting from a Multilink-Extension negotiation, in accordance with the present invention, using the Short Sequence Number Fragment Format With Classes as described in Structure 3 and accompanying text. Table 1 shows eight DS codepoint groups that map into the 4 PPP classes. For example, codepoints DF and CS0 are mapped to PPP class 0. Codepoints CS5, CS6, and CS7 are all mapped to PPP class 2. Similarly, Table 1 illustrates an example of mapping DSCPs into three classes (and 3 queues). Table 1 also illustrates an example of mapping DSCPs into 2 classes (and 2 queues). Thus, Table 1 illustrates how DS codepoints can be mapped into classes.

TABLE 1

DSCP-to-class Mappings (Short Sequence Number Format)

| | Recommended scheduling | | | | | |
|---|---|---|---|---|---|---|
| DS Codepoint | PPP Class No. | 4 Queues | PPP Class No | 3 Queues | PPP Class No. | 2 Queues |
| EF | 3 | 1 | 2 | 1 | 1 | 1 |
| CS7 | 2 | 2 | 1 | 2 | 0 | 2 |
| CS6, CS5 | | | | | | |
| AF4$x^2$, CS4 | 1 | 3 | 0 | 3 | | |
| AF3$x^2$, CS3 | | | | | | |
| AF2$x^2$, CS2 | | | | | | |
| AF1$x^2$, CS1 | | | | | | |
| DF, CS0 | 0 | 4 | | | | |

[1]Lower numbered queue has higher priority
[2]x = 1, 2, or 3

The DSCP-to-PPP class mappings shown in Table 1 also illustrate how the classes can be mapped into egress priority queues for scheduling. Each class can be assigned to an egress priority queue. For example, Table 1 (at columns 2 and 3) illustrates a class to queue mapping after two peers have negotiated to 4 queues during a Multilink-Extension negotiation in accordance with the present invention. Each of the 4 PPP classes is mapped into one of the queues shown in column 3, with class 3 mapped to the highest priority queue (that is, queue 1), class 2 mapped to queue 2, class 1 mapped to queue 3, and class 0 mapped to queue 4. In this manner, all packets of PPP class 3, will be placed in queue 1 for scheduling purposes. All packets of PPP class 2, regardless of whether codepoint CS5, CS6, or CS7, will be placed in queue 2 for scheduling purposes. All packets of PPP class 1, regardless of whether codepoint CS1, CS2, CS3, etc., will be placed into queue 2 for scheduling, and all packets of PPP class 0, regardless of whether codepoint DF or CS0, will be placed into queue 4 for scheduling. Accordingly, all packets of each PPP class will have the same PHB. Similarly, columns 4 and 5 show a PPP class to queue mapping after two peers have negotiated to 3 queues (and 3 classes) during a Multilink-Extension negotiation. The PPP class to queue mapping shown in columns 4 and 5 has class 0 mapped into queue 3. Accordingly, all packets of PPP class 0 will be placed into queue 3 for scheduling, all packets of class 1 will be placed into queue 2 for scheduling, and all packets of class 2 will be placed in queue 1 for scheduling. Columns 6 and 7 illustrate a class to queue mapping after two peers have negotiated to 2 queues (and 2 classes) during a Multilink-Extension negotiation. The class to queue mapping illustrated in columns 6 and 7 has PPP class 0 being mapped into queue 2 while PPP class 1 is mapped into queue 1.

Examples of DSCP-to-PPP class mappings, in accordance with the present invention, are also shown in Table 2. The first DSCP-to-PPP class mapping in Table 2 shows 8 PPP classes, numbered 0 to 7, resulting from a Multilink-Extension negotiation, in accordance with the present invention, using the Long Sequence Number Fragment Format With Classes as described in Structure 4 and accompanying text. Table 2 also shows 8 DS codepoint groups that map to the 8 PPP classes. Columns 1 and 2 illustrate a DSCP-to-class mapping after two peers have negotiated to 8 queues (and 8 classes) during a Multilink-Extension negotiation. Similar to Table 1, the codepoints in Table 2 are mapped into classes. However, because of the larger number of classes in Table 2, the DSCP-to-class mapping is different. In Table 1, for example, codepoints CS1, CS2, CS3, and CS4, are all mapped to class 1. In Table 2, however, codepoint CS 1 is mapped to class 1, codepoint CS2 is mapped to class 2, codepoint CS3 is mapped to class 3, and codepoint CS4 is mapped to class 4. Similarly, Table 2 shows a DSCP-to-class mapping for a situation with 6 negotiated queues (and 6 classes).

TABLE 2

DSCP-to-class Mappings (Long Sequence Number Format)

| | Recommended Scheduling[1] | | | |
|---|---|---|---|---|
| DS Codepoint | PPP Class No | 8 Queues | PPP Class No | 6 Queues |
| EF | 7 | 1 | 5 | 1 |
| CS7 | 6 | 2 | 4 | 2 |
| CS6, CS5 | 5 | 3 | 3 | 3 |
| AF4$x^2$, CS4 | 4 | 4 | 2 | 4 |
| AF3$x^2$, CS3 | 3 | 5 | | |
| AF2$x^2$, CS2 | 2 | 6 | 1 | 5 |
| AF1$x^2$, CS1 | 1 | 7 | | |
| DF, CS0 | 0 | 8 | 0 | 6 |

[1]Lower numbered queue has higher priority
[2]x = 1, 2, or 3

The DSCP-to-class mappings shown in Table 2 also illustrates how the classes can be mapped into egress priority queues for scheduling. For example, columns 2 and 3 illustrate a class to queue mapping after two peers have negotiated to 8 queues during a Multilink-Extension negotiation in accordance with the present invention. Each of the 8 classes is mapped into one of the queues as shown in columns 2 and 3. Class 7 is mapped to queue 1, class 6 is mapped to queue 2, and class 5 is mapped to queue 3, etc. Similarly, columns 4 and 5 in Table 2 illustrate a class to queue mapping after two peers have negotiated to 6 queues during a Multilink-Extension negotiation in accordance with the present invention.

Multilink-Extension embodiments of the present invention generally are more efficient than Multilink-Extension of the prior art. A minimum number of queues can be instantiated in each peer running Multilink-Extension in accordance with the present invention. In this manner, the peers do not use memory instantiating queues that will not be utilized. Additionally, Multilink-Extension of the present invention will not waste processing time scheduling queues that are not utilized. For example, if a communication device of the prior art is capable of supporting eight queues, but is running Multilink-Extension with only four classes, four of the eight supportable queues may not be utilized. These four unused queues would unnecessarily take up more memory than is needed and waste processing time in scheduling. Multilink-Extension in accordance with the present invention, on the other hand, would have negotiated the eight supportable queues down to four or fewer instantiated queues. Even if both peers can support up to eight queues, they will negotiate down to instantiating only four or fewer queues if the peers establish only four classes during a Multilink-Extension negotiation according to the present invention. In this manner, each peer will only use an amount of memory and processing time to support the four or fewer queues rather than the amount of memory and processing time to support eight queues.

Embodiments of the present invention comprise operable logic 20 adapted to perform methods (for example, Multilink-Extension negotiations) of the present invention. That is, the operable logic executes the methods of the present invention. The operable logic of the present invention can be implemented as a set of computer program instructions that are stored in a computer-readable medium and executed by an embedded microprocessor system within devices made in accordance with the present invention. Embodiments of the invention may be implemented, in whole or in part, in any conventional computer programming language. For example, preferred embodiments may be implemented in a procedural programming language (for example, "C") or an object oriented programming language (for example, "C++"). Alternative embodiments of the invention may be implemented, in whole or in part, utilizing discrete components, integrated circuitry, programmable logic used in conjunction with a programmable logic device such as a Field Programmable Gate Array (FPGA) or microprocessor, or any other means including any combination thereof. Additional embodiments of the invention may be implemented, in whole or in part, as a computer program product for use with a computer system. Such implementation may include a series of computer instructions fixed either on a tangible medium, such as a computer-readable media (for example, a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality described herein with respect to the present invention. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (for example, shrink wrapped software), pre-loaded with a computer system (for example, on system ROM or fixed disk), or distributed from a server or electronic bulletin board over a network (for example, the Internet or World Wide Web).

The present invention as described herein may refer to numerous associations, mappings, or correspondences. For example, in the description of DSCP-to-class mappings of the present invention DS codepoints are mapped to classes and classes are mapped to queues. As is known in the art of implementing operable logic as described above (including the art of computer programming, for example), these, and other, associations, mappings, and correspondences typically manifest themselves, for example, either as programming data structures (either separate from or embedded in the operable logic) to keep track of and manipulate the associations, mappings, and correspondences or, alternately, can manifest themselves in the procedural aspects of the operable logic.

In accordance with the present invention, novel devices and methods embodying dynamic queue instantiation have been provided. Dynamic queue instantiation can be implemented to improve the operation of prior art Multilink-Extensions. While the present invention has been shown and described herein with reference to specific embodiments thereof, it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereto.

What is claimed is:

1. A method comprising the steps of:
    entering a PPP (Point to Point Protocol) Multilink-Extension negotiation with a peer network device;
    comparing a preset number of maximum egress priority queues with a preset number of peer network device egress priority queues;
    negotiating a number of egress priority queues that is less than or equal to the number of peer network device egress priority queues;
    instantiating the number of negotiated egress priority queues;
    establishing, on each peer network device, a matching number of PPP Multilink-Extension classes equal to the number of negotiated egress priority queues;
    proceeding to negotiate the matching number of Multilink-extension classes with the peer network device, including instantiating the matching number of egress priority queues such that allocation of memory resources supporting the instantiated queues occurs following the negotiation, wherein scheduling resources recognize the instantiated number of egress priority queues rather than a maximum number supportable by either peer; and
    mapping DSCP (Differentiated Service Code Point) classes to the established PPP Multilink-Extension classes, the DSCP classes indicative of differentiated service level treatment.

2. The method of claim 1 wherein mapping maps each PPP Multilink-Extension class into a particular egress priority queue.

3. The method of claim 2 wherein each PPP Multilink-Extension class corresponds to a single egress priority queue.

4. The method of claim 2 wherein instantiating the queues includes:
    identifying the number of PPP multilink extension classes based on a common number of available egress priority queues;

setting a matching number of egress priority queues on each peer; and instantiating the matching number of egress priority queues.

5. The method of claim 1 wherein the negotiated number of egress priority queues is set to match the number of queues on the corresponding peer.

6. The method of claim 1 further comprising:

identifying a default number of queues between each of the peer nodes during a multilink-extension negotiation, and establishing the instantiated egress priority queues based on the identified defaults.

7. The method of claim 6, further comprising:

generating a differentiated services (DS) table indicative of a per hop behavior (PHB) experienced by each packet;

determining, based on a packet header, a QOS class of an arriving packet;

matching, based on the QOS class, the negotiated number of queues to a corresponding entry in the differentiated services table; and enqueuing the packet in the egress priority queue corresponding to the corresponding entry.

8. The method of claim 1 wherein mapping the DS codepoints further comprises:

identifying a plurality of DS codepoints, each DS codepoint indicative of a packet handling mechanism for packets bearing that DS codepoint;

identifying the number of instantiated egress priority queues; and mapping each DS codepoint to an instantiated egress priority queues based on a value of the DS codepoint and the number of instantiated egress priority queues.

9. The method of claim 1 wherein mapping further comprises mapping a highest priority DS codepoint to a highest priority instantiated queue, and mapping the next two highest priority DS codepoints to a second highest priority instantiated egress queue.

10. The method of claim 9 further comprising mapping, when there are at least four instantiated egress queues, the lowest DS codepoint to a lowest priority instantiated egress queue; and when there are at least 3 instantiated queues, mapping the remaining DS codepoints to a third priority instantiated egress queue.

11. The method of claim 9 further comprising mapping, when there are two DS codepoints, the highest priority DS codepoint to a highest priority PPP class, and mapping the remaining DS codepoints to the lowest priority PPP class.

12. The method of claim 11 further comprising mapping such that all packets of a particular value of the DS codepoint experience similar per-hop behavior.

13. The method of claim 11 further comprising storing the DS codepoint in a six bit header field, the header field indicative of per-hop behavior the packet experiences at each node.

14. A computer program product comprising a non transitory computer useable medium having embodied therein program code comprising:

logic for entering a PPP Multilink-Extension negotiation with a peer network device;

logic for comparing a preset number of maximum egress priority queues with a preset number of peer network device egress priority queues;

logic for negotiating a number of egress priority queues that is less than or equal to the number of peer network device egress priority queues;

logic for instantiating the number of negotiated egress priority queues, instantiating further including:

identifying the number of PPP multilink extension classes based on a common number of available egress priority queues;

setting a matching number of egress priority queues on each peer; and instantiating the matching number of egress priority queues such that allocation of memory resources supporting the instantiated queues occurs following the negotiation, wherein scheduling resources recognize the instantiated number of egress priority queues rather than a maximum number supportable by either peer;

logic for establishing a number of PPP Multilink-Extension classes equal to the number of negotiated egress priority queues;

logic for negotiating a matching number of Multilink-Extension classes with the peer network device; and mapping DSCP (Differentiated Service Code Point) classes to the established PPP Multilink-Extension classes, the DSCP classes indicative of differentiated service level treatment.

15. The method of claim 14 further comprising logic for mapping each PPP Multilink-Extension class into a particular egress priority queue.

16. A communication device comprising:

a memory encoded with logic for performing a method for providing network transport, the memory being a non-transitory computer readable medium;

logic for entering a PPP Multilink-Extension negotiation with a peer network device;

logic for comparing a present number of maximum egress priority queues with a preset number of peer network device egress priority queues;

logic for negotiation a number of egress priority queues that is less than or equal to the number of peer network device egress priority queues;

logic for instantiating the number of negotiated egress priority queues, instantiating further including:

identifying the number of PPP multilink extension classes based on a common number of available egress priority queues;

setting a matching number of egress priority queues on each peer; and instantiating the matching number of egress priority queues such that allocation of memory resources supporting the instantiated queues occurs following the negotiation, wherein scheduling resources recognize the instantiated number of egress priority queues rather than a maximum number supportable by either peer; and logic for establishing a number of PPP Multilink-Extension classes equal to the number of negotiated egress priority queues; and logic for negotiating a matching number of Multilink-Extension classes with the peer network device; and mapping DSCP (Differentiated Service Code Point) classes to the established PPP Multilink-Extension classes, the DSCP classes indicative of differentiated service level treatment.

* * * * *